US012216435B2

(12) United States Patent
Yang et al.

(10) Patent No.: US 12,216,435 B2
(45) Date of Patent: Feb. 4, 2025

(54) KEY STRUCTURE AND ELECTRONIC DEVICE

(71) Applicant: Huawei Technologies Co., Ltd., Shenzhen (CN)

(72) Inventors: Rongguang Yang, Dongguan (CN); Qian He, Xi'an (CN); Menglong Zhao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 18/004,146

(22) PCT Filed: Jul. 1, 2021

(86) PCT No.: PCT/CN2021/104069

§ 371 (c)(1),
(2) Date: Jan. 3, 2023

(87) PCT Pub. No.: WO2022/002212

PCT Pub. Date: Jan. 6, 2022

(65) Prior Publication Data

US 2023/0266717 A1 Aug. 24, 2023

(30) Foreign Application Priority Data

Jul. 3, 2020 (CN) ......................... 202021295727.4

(51) Int. Cl.
*G06F 1/16* (2006.01)
*G04C 3/00* (2006.01)
*G04G 17/04* (2006.01)
*G04G 21/00* (2010.01)

(52) U.S. Cl.
CPC ............. *G04G 17/04* (2013.01); *G04C 3/005* (2013.01); *G04G 21/00* (2013.01)

(58) Field of Classification Search
CPC ........................................................ G06F 1/163
See application file for complete search history.

(56) References Cited

U.S. PATENT DOCUMENTS

2021/0318715 A1* 10/2021 Ha ........................ G06F 1/1656
2021/0318716 A1* 10/2021 Evans ..................... G06F 1/163
2021/0320731 A1* 10/2021 Babu ..................... H04W 4/029

* cited by examiner

*Primary Examiner* — Anthony Q Edwards
(74) *Attorney, Agent, or Firm* — Conley Rose, P.C.

(57) ABSTRACT

A key structure includes a housing, a mounting seat, a key component, a clamping holder, a switch device, and a flexible printed circuit, where the mounting seat is mounted on the housing, the clamping holder and the key component are both mounted on the mounting seat, and the switch device is mounted on the clamping holder. The mounting seat and the clamping holder are between the switch device and the key component.

20 Claims, 14 Drawing Sheets

KEY STRUCTURE AND ELECTRONIC DEVICE

CROSS-REFERENCE TO RELATED APPLICATIONS

This is a U.S. National Stage of International Patent Application No. PCT/CN2021/104069 filed on July 1, 2021, which claims priority to Chinese Patent Application Ser. No. 202021295727.4 filed on July 3, 2020, both of which are hereby incorporated by reference in their entireties.

TECHNICAL FIELD

This application belongs to the field of switch technologies, and more specifically, to a key structure and an electronic device.

BACKGROUND

A key structure is generally disposed on a surface of an electronic device, such as a smartwatch, a wristband, or a mobile phone, and the electronic device is driven by using the key structure. The key structure generally includes a switch device and a key component. The switch device is generally mounted on a circuit board of the electronic device, the circuit board is mounted on a housing of the electronic device, the key component is generally mounted on the housing through a bar tube holder, and the key component and the switch device are oppositely disposed to drive the switch device. An assembly dimension chain between the key component and the switch device includes the key component, the bar tube holder, the housing, the circuit board, and the switch device. In other words, the assembly dimension chain between the key component and the switch device is very long. Therefore, an accumulated tolerance of a plurality of parts in the assembly dimension chain leads to a poor hand feeling of the key component. Consequently, it is difficult to manage a production process of the electronic device and costs are increased.

SUMMARY

An objective of embodiments of this application is to provide a key structure and an electronic device, to resolve a technical problem that a key component of the electronic device has a poor hand pressing feeling.

To achieve the foregoing objective, technical solutions used in the embodiments of this application are as follows:

According to a first aspect, an embodiment of this application provides a key structure, including: a mounting seat, axially penetrating through a mounting hole on a housing; a key component, mounted on the mounting seat, where one end of the key component penetrates into the housing from the mounting seat; a clamping holder, connected to the mounting seat; a switch device, mounted on the clamping holder, where the switch device is disposed opposite to one end that extends into the housing and that is of the key component, and the switch device is connected to a main board; when the key component is subjected to pressure toward the switch device, the key component is capable of abutting against the switch device to trigger the switch device.

In the key structure provided in this embodiment of this application, the clamping holder is mounted on the mounting seat, and the switch device is mounted on the clamping holder, and is electrically connected to the main board by using a flexible printed circuit. In addition, the key component is also mounted on the mounting seat. In other words, the key component and the clamping holder are both mounted on the mounting seat. The switch device is mounted on the clamping holder. In this way, only the mounting seat and the clamping holder are added to an assembly dimension chain between the switch device and the key component, so that an accumulated part error between the switch device and the key component can be reduced, a comfort level of a hand feeling of the key component can be improved, management difficulty during production of the electronic device can be reduced, and costs can be reduced.

In a possible embodiment, an outer peripheral wall of the mounting seat is adaptable to a side wall of the mounting hole, and the clamping holder is capable of axially limiting the mounting seat. In this way, the mounting seat can be circumferentially limited by using the mounting hole, and the mounting seat can be further axially limited by using the clamping holder, so that the mounting seat can be completely limited.

In a possible embodiment, a first sealing element abuts between the outer peripheral wall of the mounting seat and the side wall of the mounting hole. In this way, the first sealing element is disposed, so that water can be prevented from entering the housing from a gap between the mounting seat and the housing, thereby improving sealing property of the electronic device.

In a possible embodiment, a first insertion block is disposed on the clamping holder, a first slot is provided on the outer peripheral wall of the mounting seat, and the first insertion block is inserted into the first slot to axially limit the mounting seat.

In a possible embodiment, a plurality of oppositely disposed first insertion blocks are disposed on the clamping holder, a plurality of oppositely disposed first slots are provided on the outer peripheral wall of the mounting seat, the first slots are in a one-to-one correspondence with the first insertion blocks, and the first insertion blocks are capable of being respectively inserted into the first slots in a straight line along one direction. In this way, through insertion and fitting between the first insertion block and the first slot, the mounting seat can be axially limited, to prevent the mounting seat from axially moving, and the clamping holder can be mounted.

In a possible embodiment, an abutting plate is further disposed on the clamping holder, and the abutting plate is capable of abutting against an inner side of the housing when the first insertion block is inserted into the first slot. In other words, the abutting plate abuts against the inner side of the housing, so that the clamping holder can be further limited, thereby improving connection strength between the clamping holder and the mounting seat.

In a possible embodiment, the clamping holder includes a U-shaped structure, the switch device is located in the U-shaped structure, and the plurality of first insertion blocks are separately disposed on two sides of the U-shaped structure, and a plurality of abutting plates are separately disposed on the two sides of the U-shaped structure. That is, the entire clamping holder is formed by the U-shaped structure, two first insertion blocks, and two abutting plates. The clamping holder is of a simple structure and is convenient to manufacture.

In a possible embodiment, the U-shaped structure, the two first insertion blocks, and the two abutting plates are of an integrated structure, and have simple manufacturing processes.

In a possible embodiment, the U-shaped structure includes a bottom plate and two side plates, the two side plates are respectively disposed on two opposite sides of the bottom plate, the bottom plate and the two side plates are enclosed to form a U-shaped groove, and the two first insertion blocks are respectively disposed on the two side plates and extend into the U-shaped groove. The two abutting plates are respectively disposed on the two side plates and extend in an opposite direction of the first insertion blocks, and the two first insertion blocks are respectively spaced from the two abutting plates.

In a possible embodiment, one end of the flexible printed circuit is attached to the clamping holder, and the switch device is soldered to the flexible printed circuit. Specifically, a stiffening plate is disposed at one end of the flexible printed circuit, the stiffening plate is attached to the bottom plate by using a double-sided adhesive tape, and then the switch device is soldered to the one end of the flexible printed circuit. The structure is simple and an assembly process is simple.

In a possible embodiment, the key component includes a keycap and a drive rod that are connected to each other, the drive rod axially penetrates through the mounting seat, and the keycap is sleeved on one end that is of the mounting seat and that is exposed on the housing, for pressing.

In a possible embodiment, an accommodation groove communicating with the mounting hole is provided on an outer side of the housing, the mounting seat includes a sleeve body axially penetrating through the mounting hole, and a stopper portion that is connected to the sleeve body, performs stopping, and is accommodated in the accommodation groove, where the keycap is sleeved on the stopper portion and is at least partially accommodated in the accommodation groove; and the drive rod is disposed in a manner of penetrating through the sleeve body.

In a possible embodiment, the sleeve body and the stopper portion are of an integral connection structure, that is, the mounting seat may be made by using a same material and a same process. The manufacturing process of the mounting seat is simple.

In a possible embodiment, a second sealing element abuts between the drive rod and the sleeve body. The second sealing element is disposed to lead to good sealing property between the key component and the mounting seat. The first sealing element is disposed to lead to good sealing property of the entire key structure. A waterproof standard of the key structure can reach 5 ATM or even higher in real time. 5 ATM waterproofing means that waterproofing of the key structure is required to meet an atmospheric pressure waterproofing degree of 5 ATM.

In a possible embodiment, the keycap is of a non-rotator structure, an outer peripheral wall of the keycap is adaptable to an inner peripheral wall of the accommodation groove, and an inner peripheral wall of the keycap is adaptable to an outer peripheral wall of the stopper portion.

In a possible embodiment, at least one elastic component abuts between the keycap and a bottom portion of the accommodation groove, and an avoiding hole is provided at a location that is on the stopper portion and that corresponds to the at least one elastic component. The elastic component abuts between the keycap and the bottom portion of the accommodation groove, for ease of pressing the keycap, so that the drive rod is driven to drive the switch device or release the switch device.

In a possible embodiment, a clamping hook is disposed on the keycap, a step is disposed on the stopper portion, and the clamping hook is capable of being hooked to the step after rotation, to define a reset stroke of the keycap.

In a possible embodiment, each of the keycap and the stopper portion is of a rotator structure, a second insertion block is disposed on the clamping holder, a second slot is provided on the drive rod, and the second insertion block is inserted into the second slot and is capable of axially sliding in the second slot, to circumferentially limit the key component, and prevent the key component from rotating. In addition, the second insertion block can axially slide in the second slot. In other words, the second insertion block has movable space in the second slot, and the movable space is exactly used to limit movable space of the key component.

In a possible embodiment, a connecting plate extends on the U-shaped structure, a plurality of second insertion blocks disposed at intervals extend from the connecting plate to the middle of the U-shaped structure, a plurality of second slots are provided on two opposite sides of the drive rod, the second insertion blocks are in a one-to-one correspondence with the second slots, and the second insertion blocks are respectively inserted into the second slots.

According to a second aspect, an embodiment of this application further provides an electronic device, including a housing in which a mounting hole is provided and the foregoing key structure.

In the electronic device provided in this embodiment of this application, the key structure is disposed, so that a hand feeling of a key component of the electronic device is improved and user experience is good.

Figure 1:
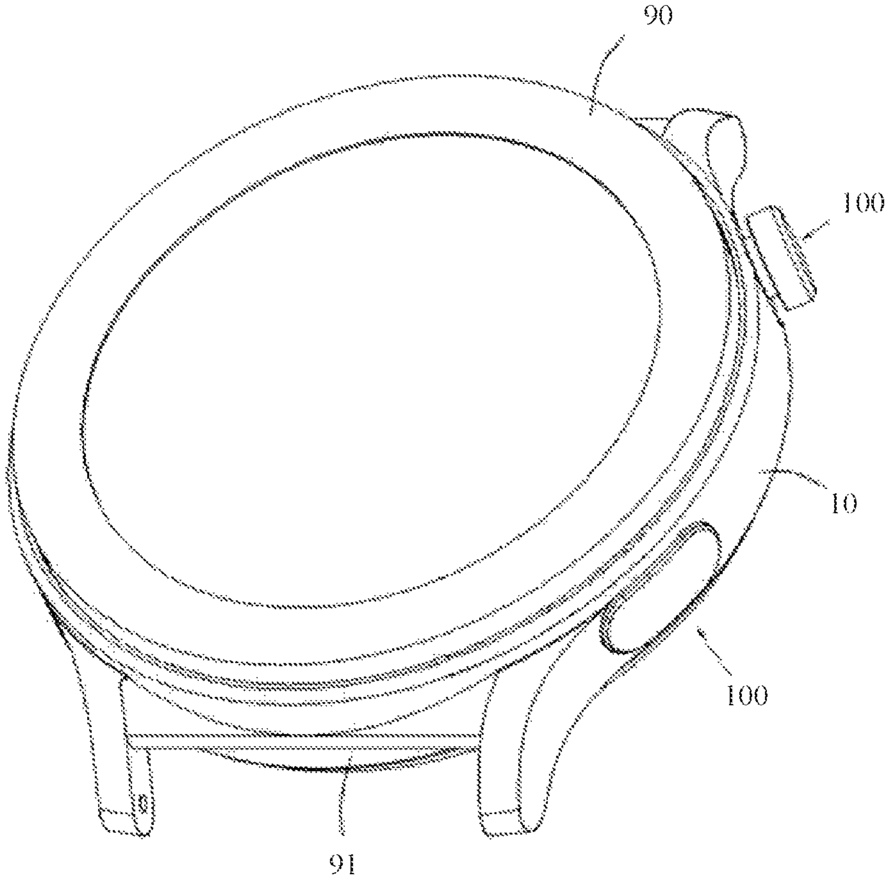
FIG. 1 is a three-dimensional schematic diagram of an electronic device according to an embodiment of this application.

100. key structure; 10. housing; 11. mounting hole; 12. accommodation groove; 20. mounting seat; 21. stopper portion; 211. avoiding hole; 212. step; 213. central hole; 214, annular groove; 22. sleeve body; 221. first sealing groove; 222. first slot; 30. key component; 31. keycap; 311. clamping hook; 32. drive rod; 321. second sealing groove; 322. second slot; 40. clamping holder; 41. U-shaped structure; 411. bottom plate; 412. side plate; 413. U-shaped groove; 42. first insertion block; 43. abutting plate; 44. second insertion block; 45. connecting plate; 50. switch device; 60. flexible printed circuit; 70. first sealing element; 80. second sealing element; 90. front housing; 91. rear housing; 92. stiffening plate; 93. double-sided adhesive tape; 94. elastic component.

DESCRIPTION OF EMBODIMENTS

To make the technical problems to be resolved, technical solutions, and beneficial effects in this application clearer, the following further describes this application in detail with reference to the accompanying drawings and embodiments. It should be understood that the specific embodiments described herein are merely used to explain this application, but are not intended to limit this application.

It should be noted that, when an element is referred to as being "fixed" or "set" to another element, the element may be directly or indirectly on the another element. When an element is referred to as being "connected to" another element, the element may be directly or indirectly connected to the another element.

It should be understood that a direction or a position relationship indicated by a term such as "length", "width", "upper", "lower", "front", "rear", "left", "right", "vertical", "horizontal", "top", "bottom", "inner", or "outer" is a direction or a position relationship shown based on the accompanying drawings, is merely used to describe this application and simplify the descriptions, but is not intended to indicate or imply that an indicated apparatus or element needs to have a particular direction or needs to be constructed and operated in a particular direction, and therefore cannot be construed as a limitation on this application.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, "a plurality of" means two or more, unless otherwise specifically limited.

The embodiments of this application relate to a key structure. The key structure may be applied to an electronic device, to control the electronic device, for example, power on/off, adjust volume, and select a channel. The electronic device may be any product having the foregoing key structure, such as a smartwatch, a wristband, a mobile phone, a tablet computer, a television, a neck-worn Bluetooth headphone, a headphone, or a true wireless stereo (True Wireless Stereo, TWS) headphone.

The following describes concepts used in the foregoing embodiments:

Flexible printed circuit: flexible printed circuit, FPC. The flexible printed circuit is a printed circuit with high reliability and excellent flexibility that is made by using polyimide or a polyester film as a base material.

A switch device is an electronic element that can open a circuit, interrupt a current, or cause a current to flow to another circuit.

As shown in FIG. 1 to FIG. 5, a key structure 100 provided in embodiments of this application is described.

The key structure 100 includes a mounting seat 20, a key component 30, a clamping holder 40, and a switch device 50. The electronic device includes a housing 10, a mounting hole 11 is provided on the housing 10, the mounting seat 20 is mounted in the mounting hole 11 and axially penetrates through the mounting hole 11, the key component 30 is mounted on the mounting seat 20, and one end of the key component 30 axially penetrates into the housing 10 from the mounting seat 20. The clamping holder 40 is connected to the mounting seat 20, the switch device 50 is mounted on the clamping holder 40, the switch device 50 is disposed opposite to one end that extends into the housing 10 and that is of the key component 30, and the switch device 50 is connected to a main board by using a flexible printed circuit 60. When the key component 30 is subjected to pressure toward the switch device 50, the key component 30 is capable of abutting against the switch device 50 to trigger the switch device 50.

Specifically, the key component 30 is mounted on the mounting seat 20, one end of the key component 30 extends into the housing 10 to trigger the switch device 50, the other end of the key component 30 is located on an outer side of the housing 10 for pressing, and the clamping holder 40 is also mounted on the mounting seat 20. The switch device 50 is mounted on the clamping holder 40, that is, an assembly dimension chain between the switch device 50 and the key component 30 is the switch device 50, the mounting seat 20, the clamping holder 40, and the key component 30.

The electronic device in this embodiment of this application is a device that includes electronic parts and components such as a flexible printed circuit, a transistor, and an electron tube and that uses an electronic technology to play a role, including a mobile phone, an MP3, an MP4, a tablet computer, a wristband, a watch, and the like. Preferably, the key structure in this embodiment of this application may be applied to an electronic device on which a side key (for example, a side edge of the housing of the electronic device) may be mounted, such as a key structure on which a volume key may be mounted and that is on a side edge of a housing of a mobile phone, a tablet computer, or the like, or a key structure of an on/off key. For example, the key structure 100 may be used as a key of a watch.

For example, the key component 30 may be a button.

In the key structure 100 provided in this embodiment of this application, the clamping holder 40 is mounted on the mounting seat 20, and the switch device 50 is mounted on the clamping holder 40, and is electrically connected to the main board by using the flexible printed circuit 60. In addition, the key component 30 is also mounted on the mounting seat 20. In other words, the key component 30 and the clamping holder 40 are both mounted on the mounting seat 20. The switch device 50 is mounted on the clamping holder 40. In this way, only the mounting seat 20 and the clamping holder 40 are added to an assembly dimension chain between the switch device 50 and the key component 30, so that an accumulated part error between the switch device 50 and the key component 30 can be reduced, a comfort level of a hand feeling of the key component 30 can be improved, management difficulty during production of the electronic device can be reduced, and costs can be reduced. In addition, the clamping holder 40 further provides a reliable fastening structure to the switch device 50.

Figure 5:
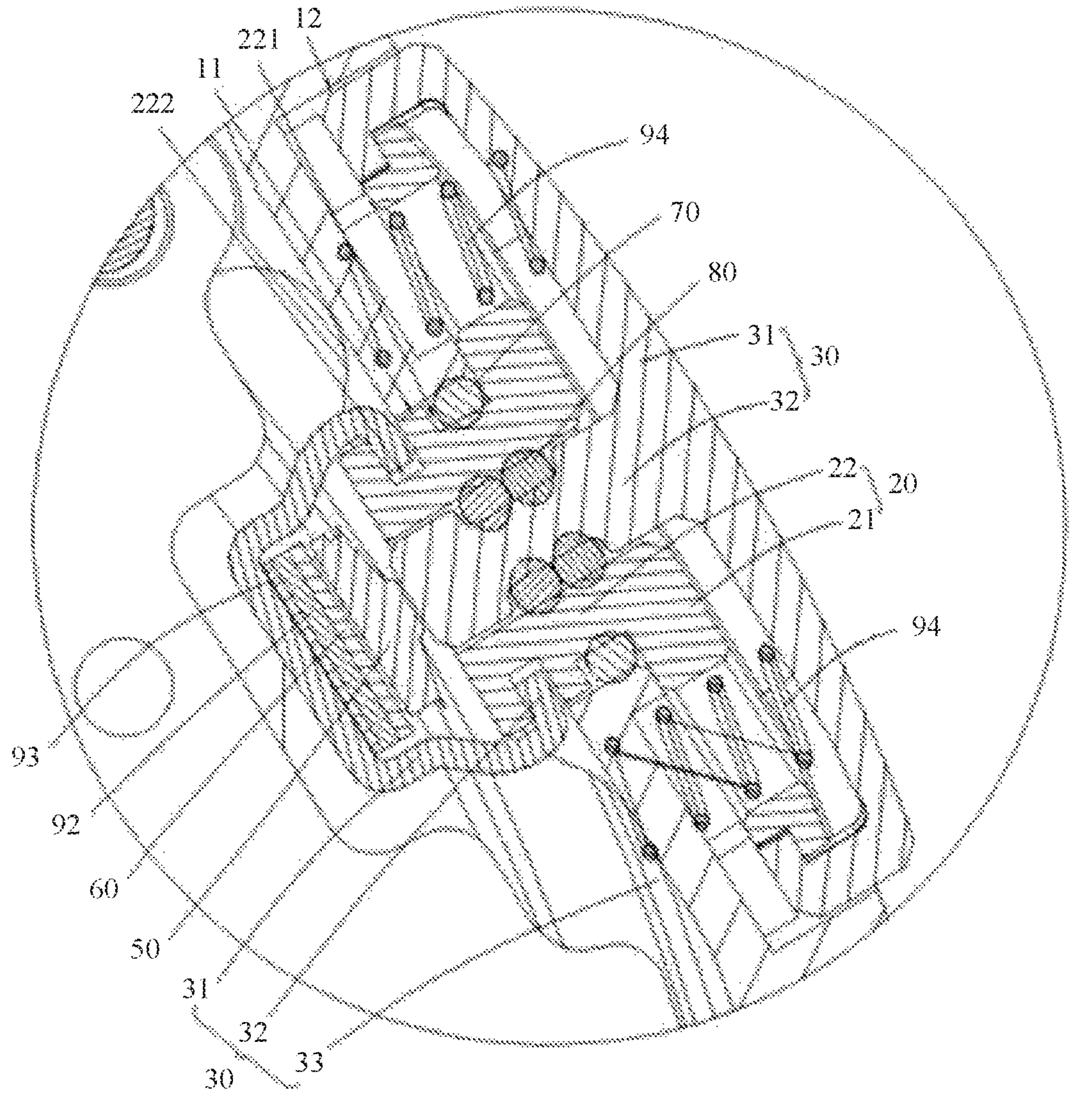
FIG. 5 is a locally enlarged schematic diagram of an area A in FIG. 4.
Figure 6:
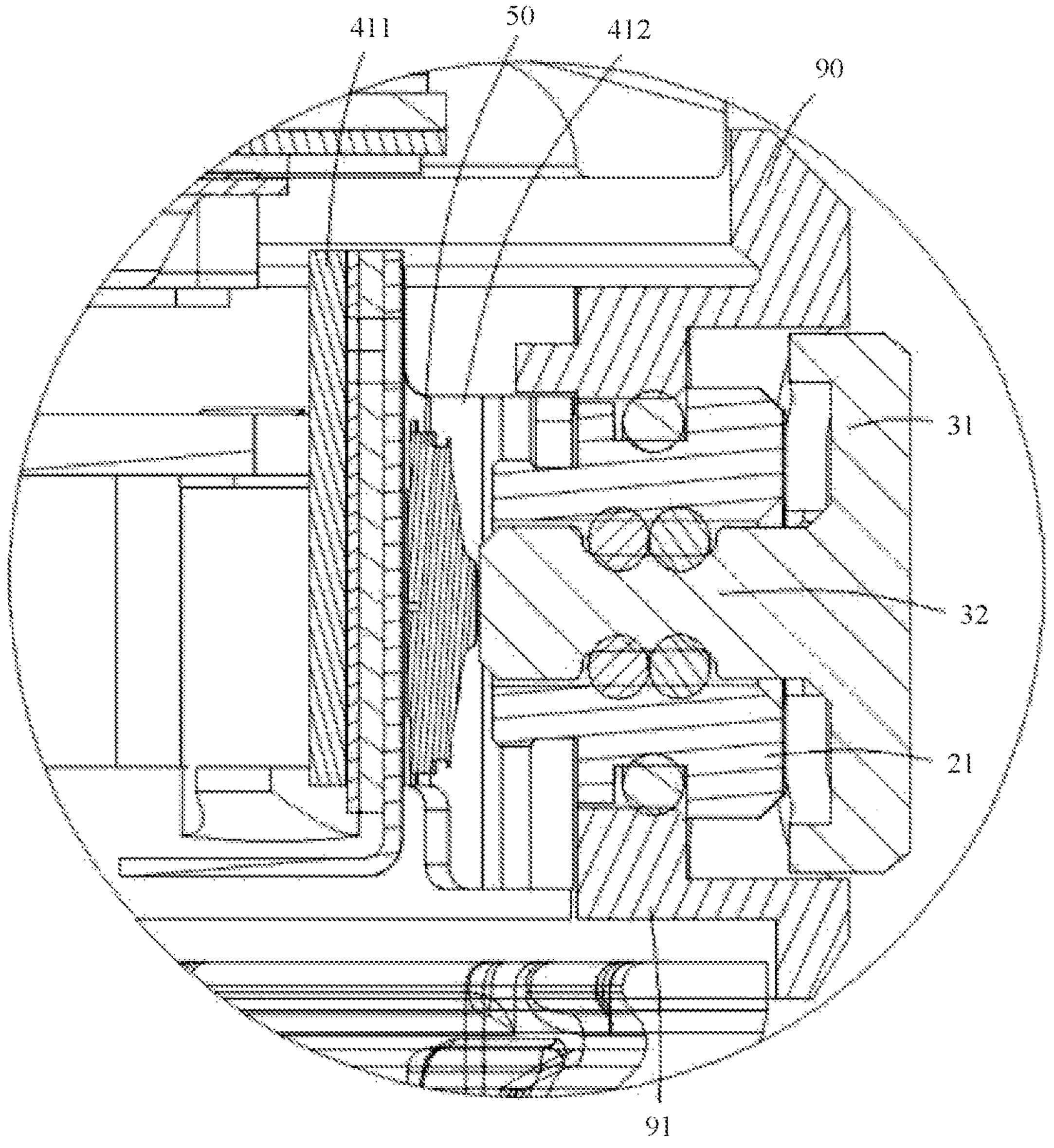
FIG. 6 is a locally sectional schematic diagram from another angle of the key structure in FIG. 1.

In a specific embodiment, referring to FIG. 5 and FIG. 6, an outer peripheral wall of the mounting seat 20 is adaptable to a side wall of the mounting hole 11, and the clamping holder 40 is capable of axially limiting the mounting seat 20. Specifically, the outer peripheral wall of the mounting seat

20 is a circumferential outer side wall of the mounting seat 20. When the outer peripheral wall of the mounting seat 20 is adaptable to the side wall of the mounting hole 11, the mounting hole 11 is capable of circumferentially limiting the mounting seat 20, and the clamping holder 40 axially limits the mounting seat 20, so that the mounting seat 20 can be completely limited.

In a specific embodiment, referring to FIG. 5, a first sealing element 70 abuts between the outer peripheral wall of the mounting seat 20 and the side wall of the mounting hole 11. In this way, the first sealing element 70 is disposed, so that water can be prevented from entering the housing 10 from a gap between the mounting seat 20 and the housing 10, thereby improving sealing property of the electronic device.

Specifically, the first sealing element 70 is an O-shaped sealing ring, and an annular first sealing groove 221 is formed on the outer peripheral wall of the mounting seat 20. The O-shaped sealing ring is accommodated in the first sealing groove 221, and at least partially protrudes out of the first sealing groove 221 to abut against the side wall of the mounting hole 11, thereby forming a sealing connection between the mounting seat 20 and the housing 10. It may be understood that, in another embodiment of this application, the first sealing groove 221 may also be formed on the side wall of the mounting hole 11. In addition, there may be one or a plurality of first sealing elements 70.

Figure 7:
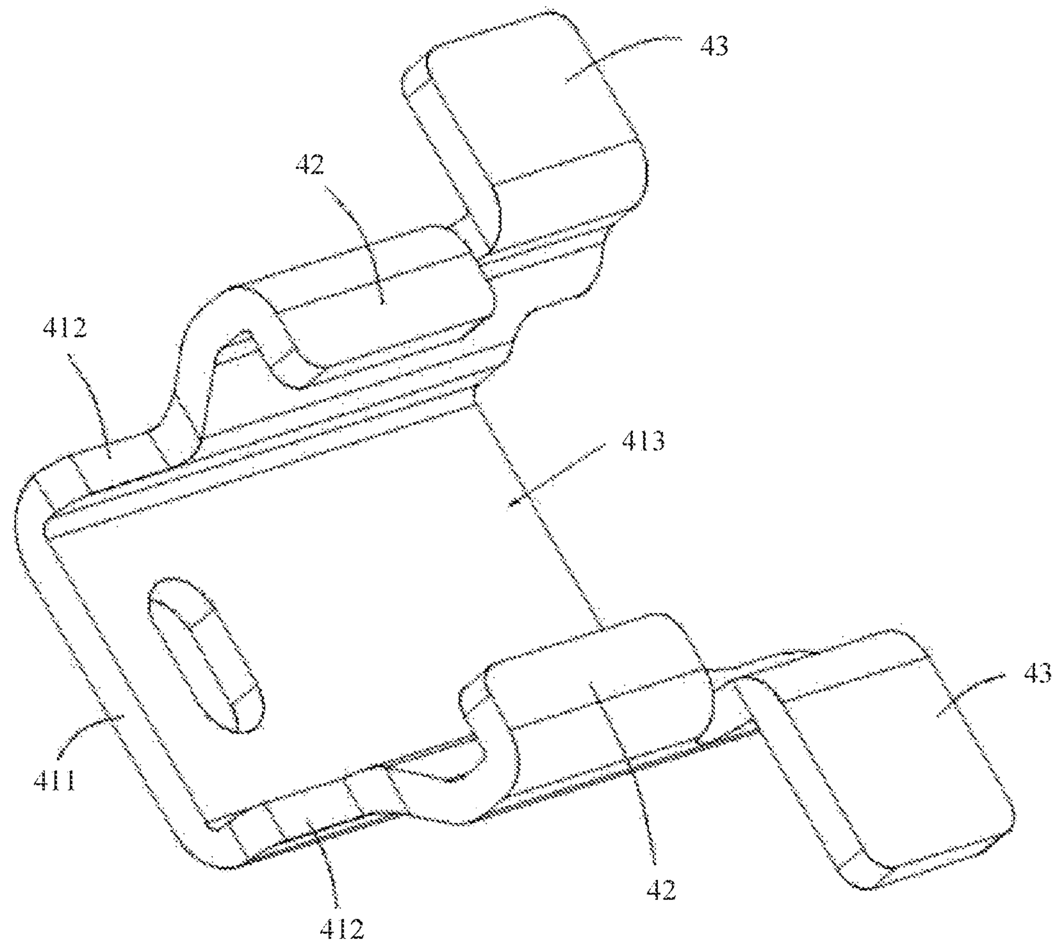
FIG. 7 is a schematic diagram of a structure of a clamping holder in FIG. 3.
Figure 8:
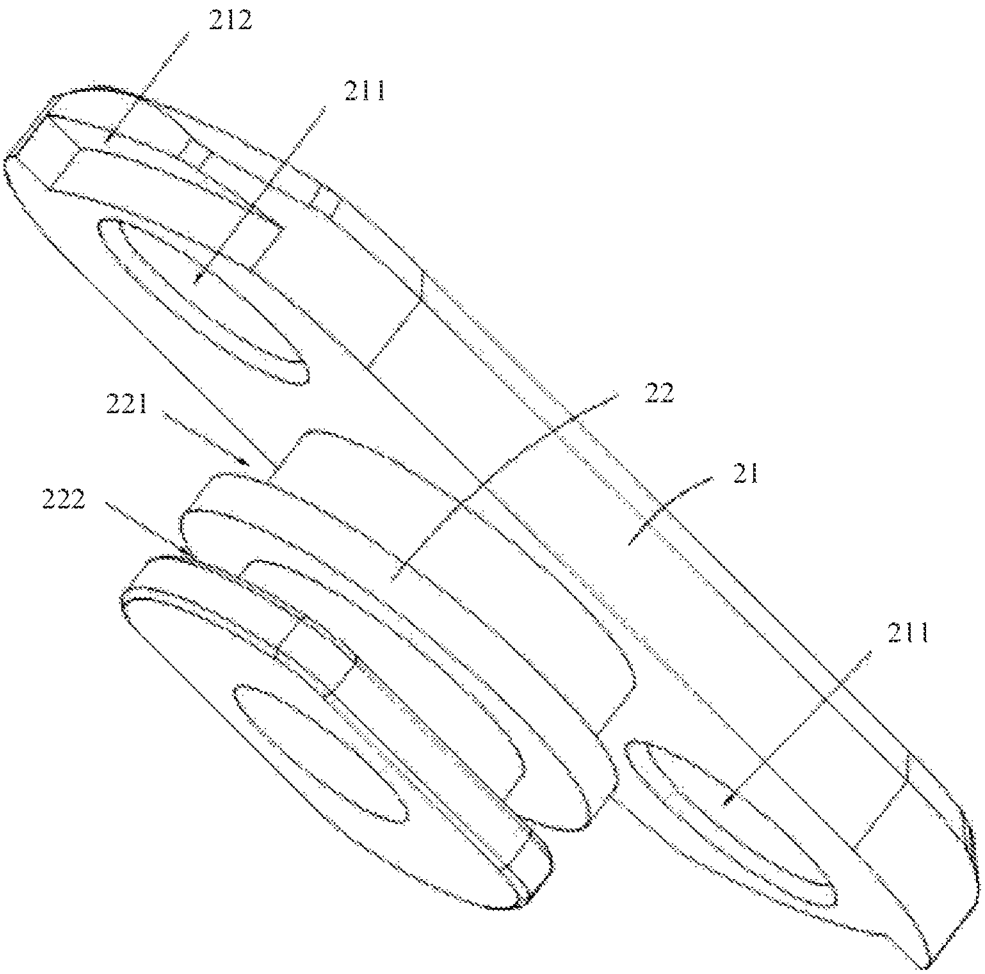
FIG. 8 is a schematic diagram of a structure of a mounting seat in FIG. 3.

In a specific embodiment, referring to FIG. 5, FIG. 7, and FIG. 8, a first insertion block 42 is disposed on the clamping holder 40, a first slot 222 is provided on the outer peripheral wall of the mounting seat 20, and the first insertion block 42 is inserted into the first slot 222 to axially limit the mounting seat 20. Specifically, the clamping holder 40 is disposed in the housing 10, and the first slot 222 is formed on the outer peripheral wall of one end that extends into the housing 10 and that is of the mounting seat 20. In this way, through insertion and fitting between the first insertion block 42 and the first slot 222, the mounting seat 20 can be axially limited, to prevent the mounting seat 20 from axially moving, and the clamping holder 40 can be mounted. In addition, a problem in the conventional technology that a clamping spring is easy to fall off is also resolved.

Referring to FIG. 5 and FIG. 7, a plurality of oppositely disposed first insertion blocks 42 are disposed on the clamping holder 40, a plurality of oppositely disposed first slots 222 are provided on the outer peripheral wall of the mounting seat 20, the first insertion blocks 42 are in a one-to-one correspondence with the first slots 222, and the first insertion blocks 42 are capable of being respectively inserted into the first slots 222 in a straight line along one direction. During actual mounting, after the mounting seat 20 is mounted in the mounting hole 11, the clamping holder 40 is directly pushed in a straight line along one direction toward the mounting seat 20, until the first insertion blocks 42 are respectively inserted into the first slots 222 correspondingly. Assembly of the first insertion blocks 42 and the first slots 222 is simple, insertion is performed in a straight line, the structure is simple, and limiting is stably performed.

For example, the plurality of first insertion blocks 42 disposed on the clamping holder 40 include a first insertion block a and a first insertion block b. The first insertion block a and the first insertion block b are oppositely disposed, and the plurality of oppositely disposed first slots 222 provided on the outer peripheral wall of the mounting seat 20 include a first slot a and a first slot b. The first slot a and the first slot b are oppositely disposed. The first slot a can be inserted into the first slot a in a straight line along one direction, and the first slot b can be inserted into the first slot b in a straight line along one direction.

In a specific embodiment, referring to FIG. 5 and FIG. 7, an abutting plate 43 is further disposed on the clamping holder 40, and the abutting plate 43 is capable of abutting against an inner side of the housing 10 when the first insertion block 42 is inserted into the first slot 222. In other words, the abutting plate 43 abuts against the inner side of the housing 10, so that the clamping holder 40 can be further limited, thereby improving connection strength between the clamping holder 40 and the mounting seat 20.

Specifically, two abutting plates 43 are disposed on the clamping holder 40, the two abutting plates 43 are oppositely disposed, and the two abutting plates 43 respectively abut at different locations on the inner side of the housing 10, so that the clamping holder 40 reliably abuts against the housing 10.

In a specific embodiment, referring to FIG. 5, the clamping holder 40 includes a U-shaped structure 41, the switch device 50 is located in the U-shaped structure 41, a plurality of first insertion blocks 42 are separately disposed on two sides of the U-shaped structure 41, and a plurality of abutting plates 43 are separately disposed on the two sides of the U-shaped structure 41. In other words, the entire clamping holder 40 is formed by the U-shaped structure 41, the first insertion blocks 42, and the abutting plates 43. The clamping holder 40 is of a simple structure, and is convenient to manufacture.

Specifically, the U-shaped structure 41, the two first insertion blocks 42, and the two abutting plates 43 are of an integrated structure. In this embodiment, in the clamping holder 40, metal sheets are bent to form the U-shaped structure 41, the two first insertion blocks 42, and the two abutting plates 43. The clamping holder 40 has a simple manufacturing process.

Referring to FIG. 5 and FIG. 7, the U-shaped structure 41 includes a bottom plate 411 and two side plates 412, the two side plates 412 are respectively disposed on two opposite sides of the bottom plate 411, the bottom plate 411 and the two side plates 412 are enclosed to form a U-shaped groove 413, and the two first insertion blocks 42 are respectively disposed on the two side plates 412 and extend into the U-shaped groove 413. The two abutting plates 43 are respectively disposed on the two side plates 412 and extend in an opposite direction of the first insertion blocks 42, and the two first insertion blocks 42 are respectively spaced from the two abutting plates 43. During mounting, the switch device 50 and one end of the flexible printed circuit 60 are both mounted on the bottom plate 411 and accommodated in the U-shaped groove 413, then the two first insertion blocks 42 are respectively inserted into the two first slots 222 of the mounting seat 20 along one direction, and the two abutting plates 43 are enabled to separately abut against the inner side of the housing 10, so that the switch device 50 and the clamping holder 40 are mounted.

Figure 2:
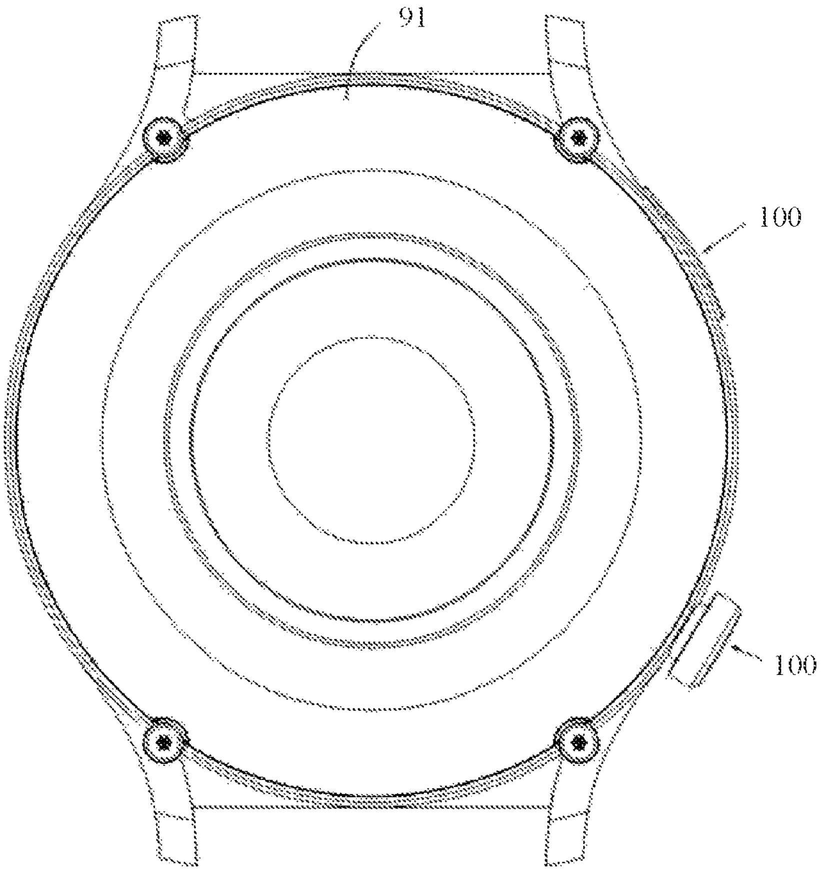
FIG. 2 is a schematic diagram of a rear side of an electronic device according to an embodiment of this application.
Figure 3:
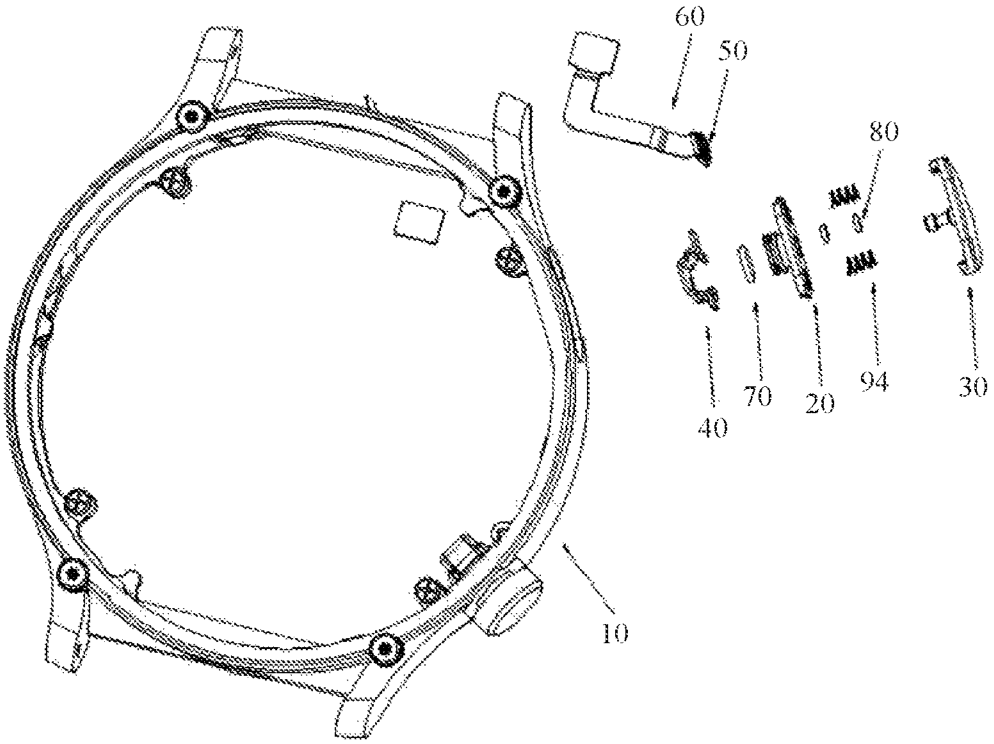
FIG. 3 is a schematic exploded view of a key structure according to an embodiment of this application.

In addition, referring to FIG. 1, FIG. 2, and FIG. 6, the housing 10 is a middle frame structure of the electronic device, a front housing 90 and a rear housing 91 are further disposed on the entire electronic device, and the front housing 90 and the rear housing 91 are respectively mounted on a front side and a rear side of the housing 10. In addition, the front housing 90 and the rear housing 91 respectively abut against front and rear sides of the U-shaped structure 41, thereby completely mounting and locating the clamping holder 40. Specifically, the front housing 90 and the rear housing 91 respectively abut against front and rear sides of the side plate 412.

In a specific embodiment, one end of the flexible printed circuit 60 is attached to the clamping holder 40, and the switch device 50 is soldered to one end of the flexible printed circuit 60. Specifically, a stiffening plate 92 is disposed at one end of the flexible printed circuit 60, the stiffening plate 92 is attached to the bottom plate 411 by using a double-sided adhesive tape 93, and then the switch device 50 is soldered to the one end of the flexible printed circuit 60. The structure is simple and an assembly process is simple.

Figure 4:
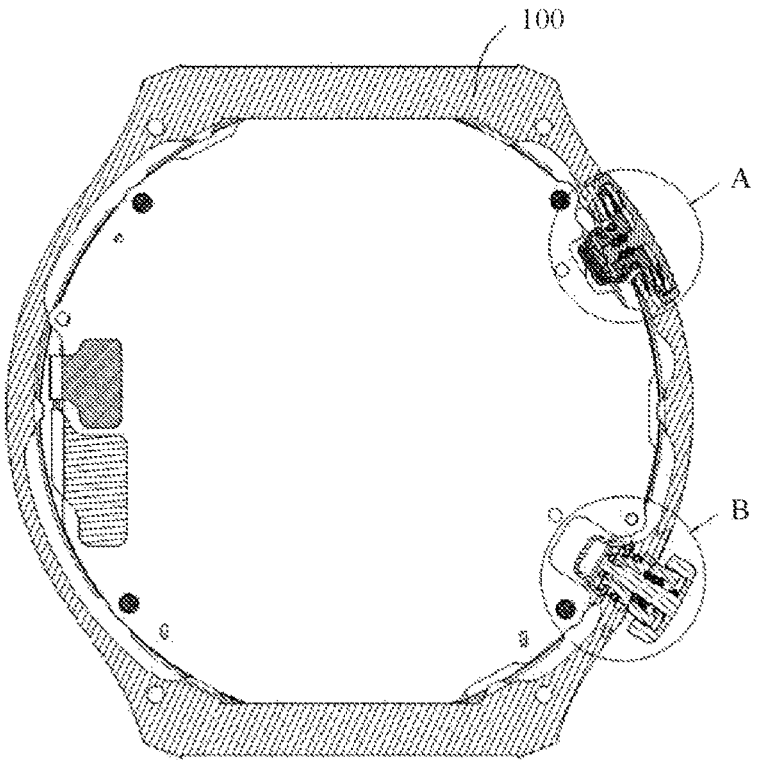
FIG. 4 is a schematic sectional diagram of a key structure in FIG. 1.

In a specific embodiment, referring to FIG. 4, the key component 30 includes a keycap 31 and a drive rod 32. The keycap 31 and the drive rod 32 are connected to each other, and are specifically integrally connected. The drive rod 32 axially penetrates through the mounting seat 20, and the keycap 31 is disposed on one end that is of the mounting seat 20 and that is exposed on the housing 10, for pressing.

In a specific embodiment, referring to FIG. 5, an accommodation groove 12 is provided on an outer side of the housing 10, the accommodation groove 12 communicates with the mounting hole 11, the accommodation groove 12 is enclosed outside the mounting hole 11, and a size of the accommodation groove 12 is greater than a size of the mounting hole 11. The mounting seat 20 includes a sleeve body 22 and a stopper portion 21, the sleeve body 22 is cylindrical and axially penetrates through the mounting hole 11, the stopper portion 21 is connected to the sleeve body 22, and the stopper portion 21 performs stopping at one end of the mounting hole 11 and is accommodated in the accommodation groove 12. The keycap 31 is sleeved on the stopper portion 21 and is at least partially accommodated in the accommodation groove 12, and the drive rod 32 penetrates through the sleeve body 22. Herein, because the keycap 31 is movable, and in order to make the keycap 31 easy to be pressed by hand, the keycap 31 generally partially extends out of the accommodation groove 12.

Specifically, the sleeve body 22 and the stopper portion 21 are of an integral connection structure, that is, the mounting seat 20 may be made by using a same material and a same process. The manufacturing process of the mounting seat 20 is simple.

In a specific embodiment, referring to FIG. 5, a second sealing element 80 abuts between the drive rod 32 and the sleeve body 22. The second sealing element 80 is disposed to lead to good sealing property between the key component 30 and the mounting seat 20. The first sealing element 70 is disposed to lead to good sealing property of the entire key structure 100. A waterproof standard of the key structure can reach 5 ATM or even higher in real time. 5 ATM waterproofing means that waterproofing of the key structure 100 is required to meet an atmospheric pressure waterproofing degree of 5 ATM.

Specifically, two second sealing elements 80 abut between the drive rod 32 and the sleeve body 22, and the two second sealing elements 80 are disposed at an axial interval along the sleeve body 22. The two second sealing elements 80 are disposed, so that sealing property between the key component 30 and the mounting seat 20 is better. It may be understood that, in another embodiment of this application, a quantity of second sealing elements 80 may alternatively be one, three, or more than three. This is not uniquely limited herein.

Figure 9:
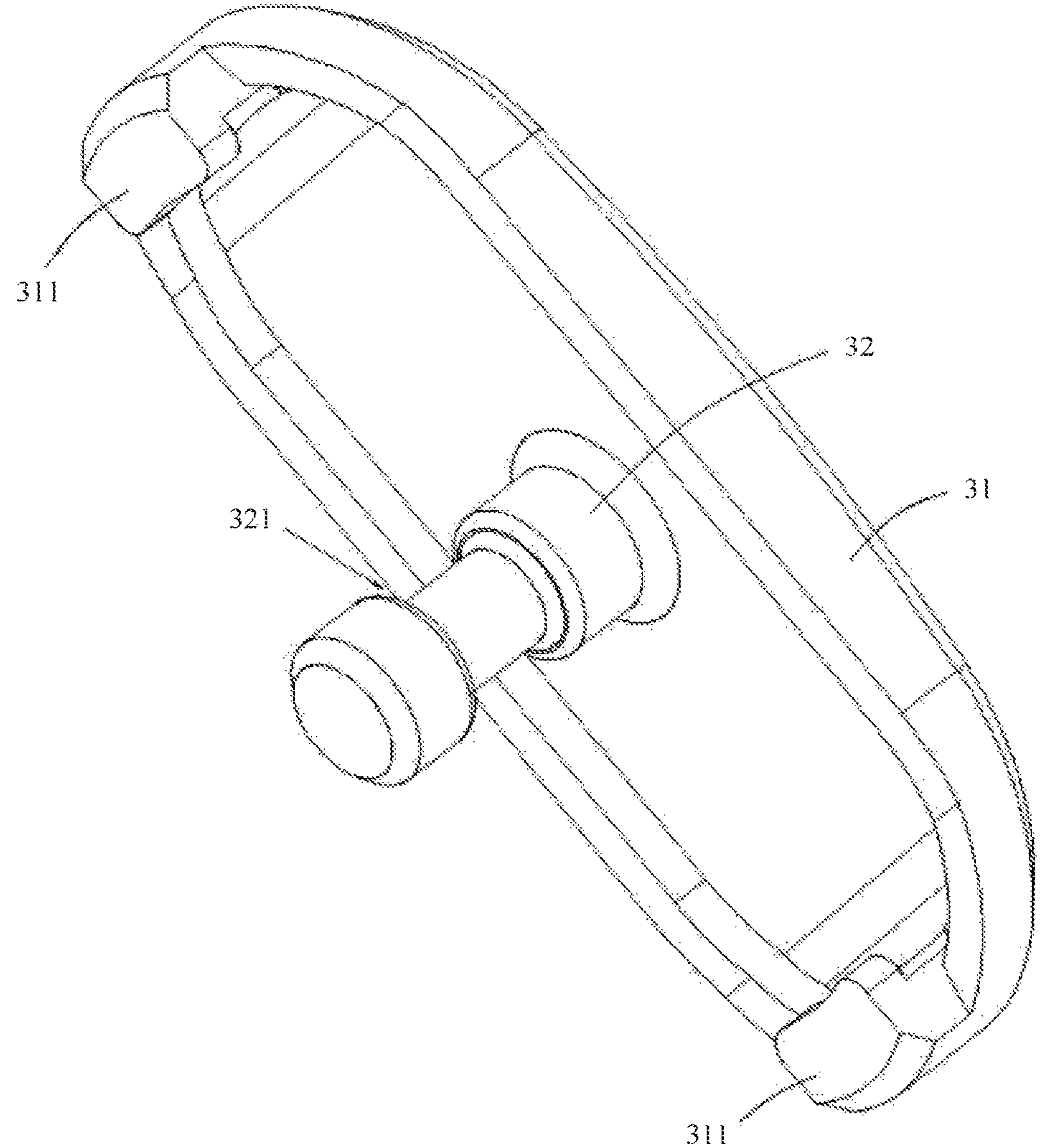
FIG. 9 is a schematic diagram of a structure of a key component in FIG. 3.
Figure 10:
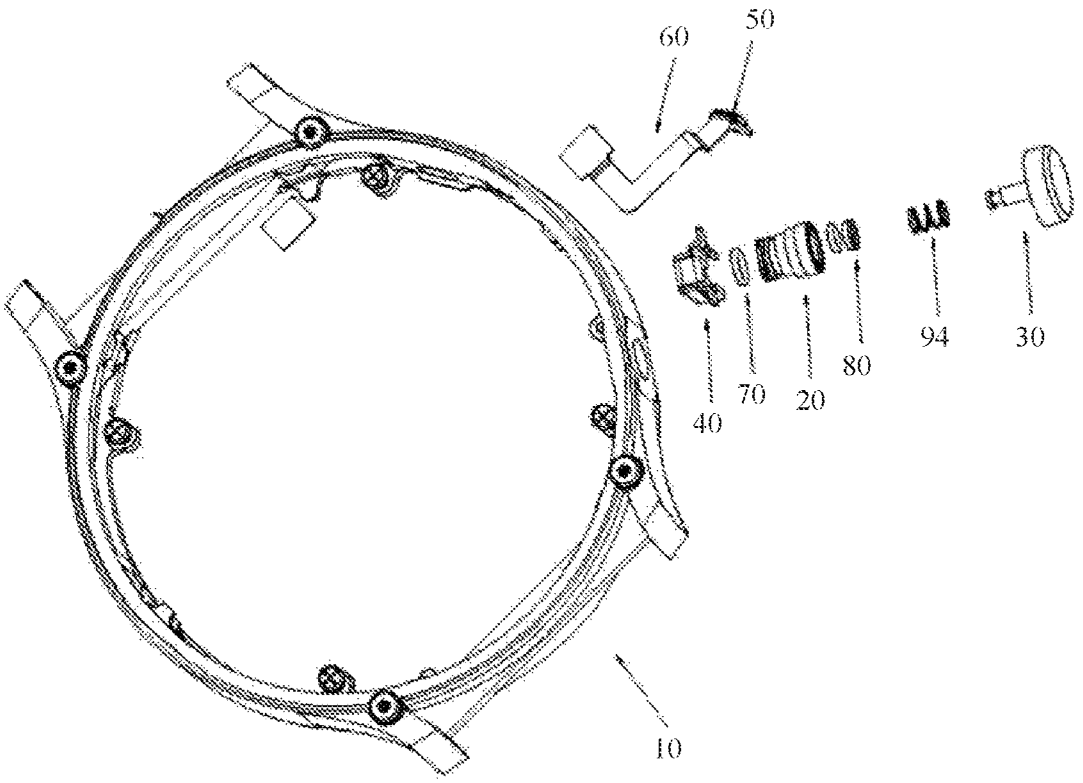
FIG. 10 is a schematic exploded view of a key structure according to another embodiment of this application.
Figure 11:
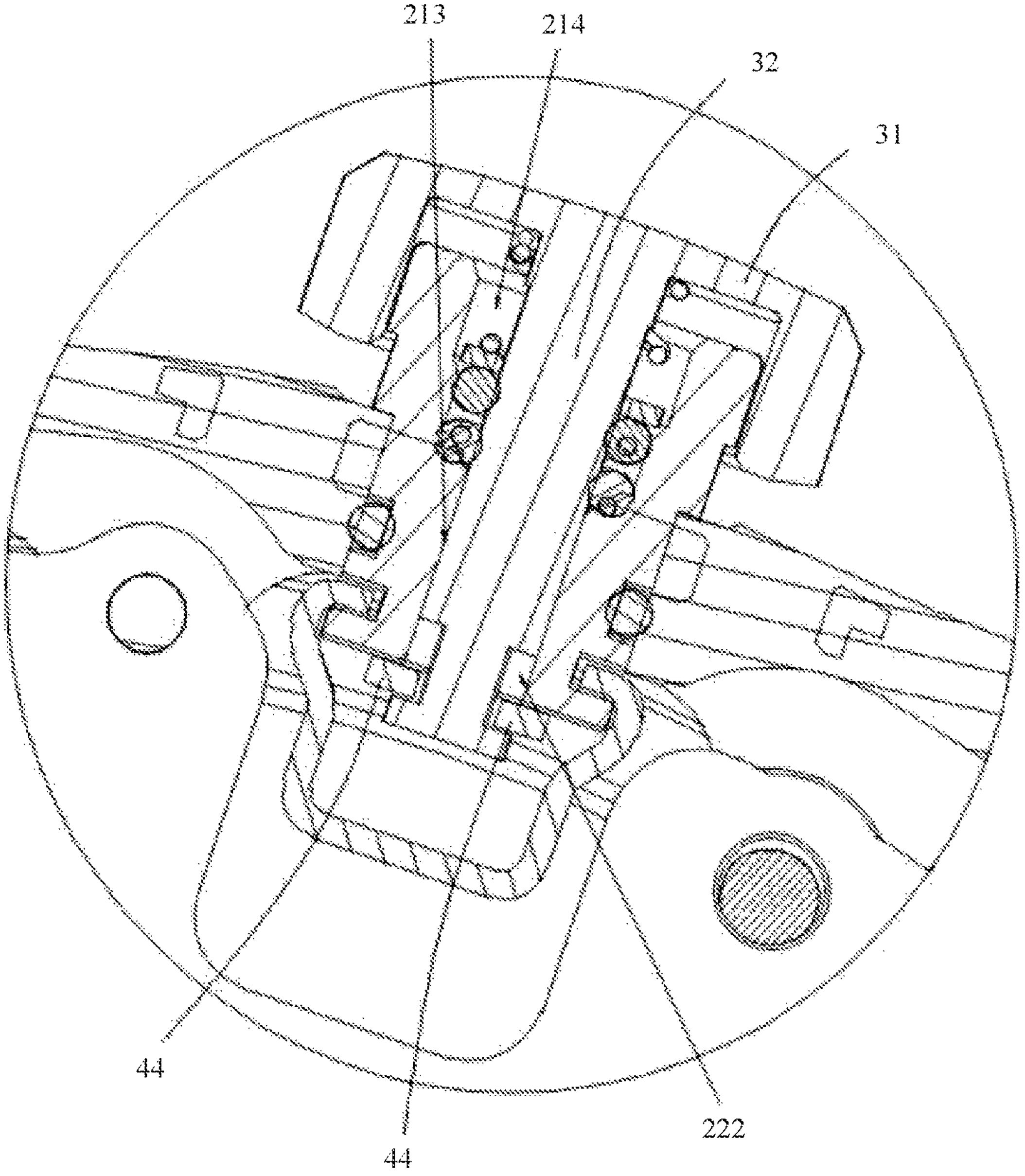
FIG. 11 is a locally enlarged diagram of an area B in FIG. 4.
Figure 12:
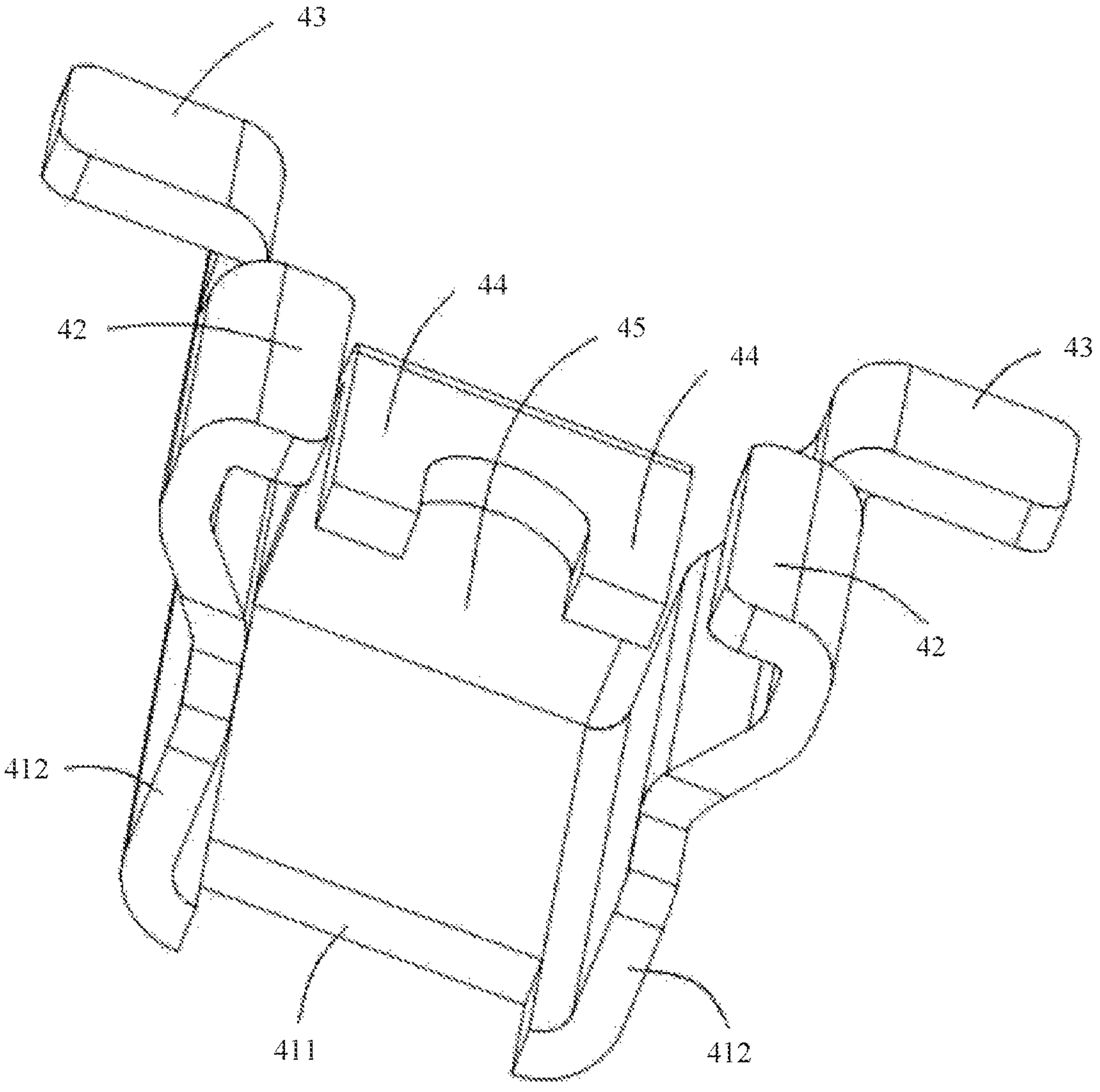
FIG. 12 is a schematic diagram of a structure of a clamping holder in FIG. 10.
Figure 13:
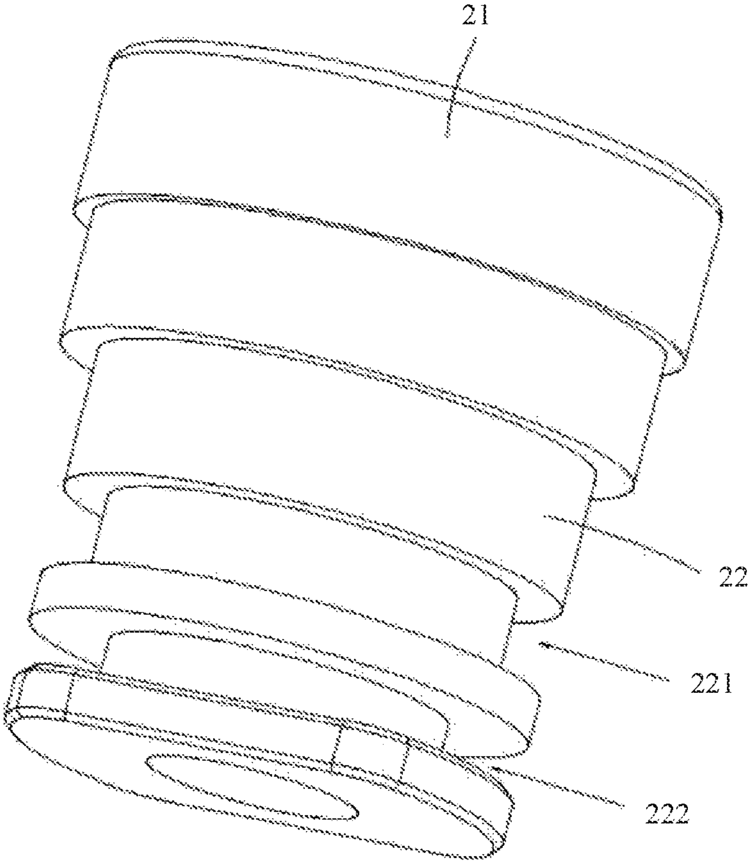
FIG. 13 is a schematic diagram of a structure of a mounting seat in FIG. 10.
Figure 14:
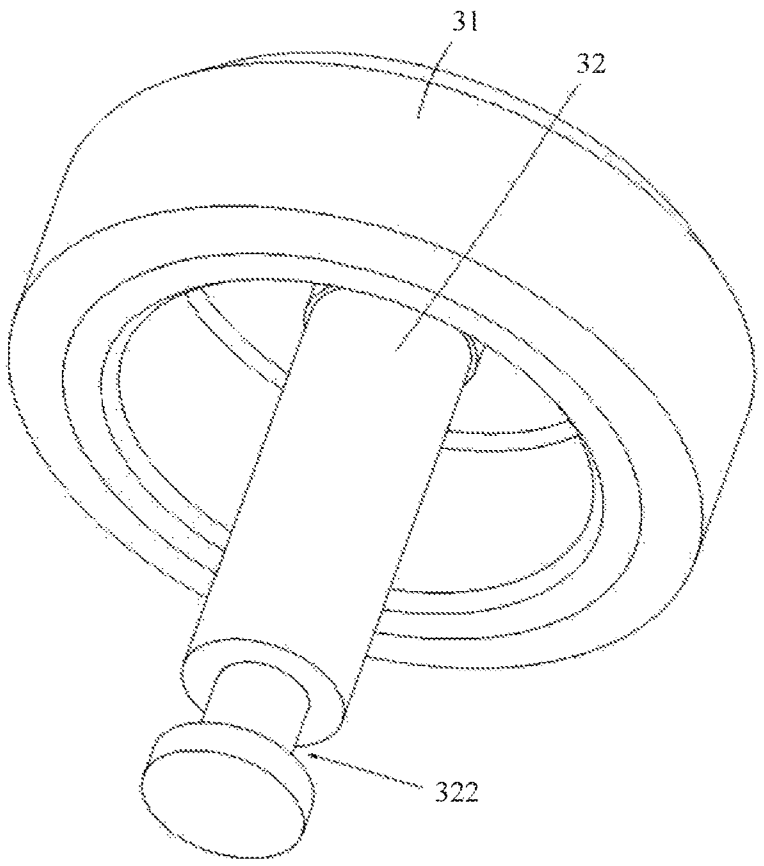
FIG. 14 is a schematic diagram of a structure of a key component in FIG. 10, where reference signs in the figures are as follows.

Referring to FIG. 5 and FIG. 9, the second sealing element 80 is also an O-shaped sealing ring, and a second sealing groove 321 is formed on an outer peripheral wall of the sleeve body 22. The second sealing element 80 is accommodated in the second sealing groove 321, and at least partially protrudes out of the second sealing groove 321 to abut against an inner peripheral wall of the drive rod 32.

In a specific embodiment, referring to FIG. 5 to FIG. 9, the keycap 31 is of a non-rotator structure, an outer peripheral wall of the keycap 31 is adaptable to an inner peripheral wall of the accommodation groove 12, and an inner peripheral wall of the keycap 31 is adaptable to an outer peripheral wall of the stopper portion 21. Both the outer peripheral wall and the inner peripheral wall herein are a circumferential outer side wall and a circumferential inner side wall. In this application, the accommodation groove 12 and the stopper portion 21 are limited, so that the keycap 31 can be circumferentially limited, to prevent the keycap 31 from circumferentially rotating.

In a specific embodiment, referring to FIG. 5, at least one elastic component 94 abuts between the keycap 31 and a bottom portion of the accommodation groove 12, and an avoiding hole 211 is provided at a location that is on the stopper portion 21 and that corresponds to the at least one elastic component 94. The elastic component 94 abuts between the keycap 31 and the bottom portion of the accommodation groove 12, for ease of pressing the keycap 31, so that the drive rod 32 is driven to drive the switch device 50 or release the switch device 50.

Specifically, the keycap 31 is of a runway type, two elastic components 94 abut between the keycap 31 and the bottom portion of the accommodation groove 12, the elastic component 94 is a spring, and the two springs respectively abut between two ends of the keycap 31 along a length direction and the bottom portion of the accommodation groove 12. The stopper portion 21 is also of a runway type, avoiding holes 211 are provided at locations that are of the stopper portion 21 and that correspond to the two springs, and the two springs respectively penetrate through the two avoiding holes 211, and respectively abut between the keycap 31 and the bottom portion of the accommodation groove 12.

In a specific embodiment, referring to FIG. 8 and FIG. 9, a clamping hook 311 is disposed on the keycap 31, a step 212 is disposed on the stopper portion 21, and the clamping hook 311 is capable of being hooked to the step 212 after rotation, to define a reset stroke of the keycap 31. It should be noted herein that the reset stroke of the keycap 31 is a rebounding stroke of the keycap 31 under a push of the elastic component 94 after the keycap 31 is pressed, that is, when the keycap 31 is pressed, the drive rod 32 drives the switch device 50. At the same time, the elastic component 94 is compressed and accumulates elastic energy. When the keycap 31 is released, the keycap 31 rebounds under elastic pressure of the elastic component 94. At this time, the keycap 31 is hooked to the step 212 of the stopper portion 21 by the hook 311 on the keycap 31, thereby preventing the keycap 31 from rebounding too much due to the elastic pressure of the elastic component 94, to fall out of the housing 10.

Specifically, each of edges of the two ends of the keycap 31 in the length direction extends to the housing 10 to form the hook 311, and two steps 212 are formed on the outer peripheral wall of the stopper portion 21. During mounting, the keycap 31 and the stopper portion 21 are circumferentially staggered by an angle, and then the keycap 31 is rotated back relative to the stopper portion 21, so that the two hooks 311 can be correspondingly screwed under the two steps 212. In this way, the two hooks 311 can be stopped under the two steps 212 under the action of the elastic component 94, to limit the rebounding stroke of the keycap 31.

In another embodiment of this application, referring to FIG. 10 to FIG. 14, both the keycap 31 and the stopper portion 21 are of a rotator structure, and correspondingly, the accommodation groove 12 is also of a circular shape. In addition, to circumferentially limit the entire key component 30, a second insertion block 44 is disposed on the clamping holder 40, a second slot 322 is provided on the drive rod 32, and the second insertion block 44 is inserted into the second slot 322, thereby circumferentially limiting the key component 30, to prevent the key component 30 from rotating. Certainly, in an embodiment in which the keycap 31 is of a non-rotator structure, the key component 30 may also be limited by using the second insertion block and the second slot. This is not uniquely limited herein.

In addition, a connecting plate 45 extends on the bottom plate 411, the connecting plate 45 extends to the middle of the U-shaped structure 41 to form a plurality of second insertion blocks 44 disposed at intervals, a plurality of second slots 322 are separately provided on two opposite sides of the drive rod 32, and the second insertion blocks 44 are in a one-to-one correspondence with the second slots 322. The second insertion blocks 44 are respectively disposed in the second slots 322, and the second insertion blocks 44 can axially slide in the second slots 322. That is, the second insertion blocks 44 have movable space in the second slots 322, and the movable space is exactly used to define movable space of the key component 30.

For example, the plurality of second insertion blocks 44 disposed on the connecting plate 45 include a second insertion block a and a second insertion block b. The second insertion block a and the second insertion block b are disposed at intervals, and the plurality of oppositely disposed second slots 322 provided on an outer peripheral wall of the drive rod 32 include a second slot a and a second slot b. The second slot a and the second slot b are oppositely disposed. The second slot a can be inserted into the second slot a in a straight line along one direction, and the second slot b can be inserted into the second slot b in a straight line along one direction.

In addition, because the movable space of the key component 30 is limited, it is unnecessary to dispose the clamping hook 311 on the keycap 31 and also the step 212 on the mounting seat 20.

In addition, because the keycap 31 is of a rotator shape, to make the keycap 31 be pressed stably, the elastic component 94 abuts between a central position of the keycap 31 and a central position of the stopper portion 21. Specifically, a central hole 213 is provided in the center of the stopper portion 21, the drive rod 32 penetrates through the central hole 213, and an annular groove 214 communicating with the central hole 213 is provided in the center of the stopper portion 21. The elastic component 94 is a cylindrical spring, the cylindrical spring is sleeved on the drive rod 32, one end of the cylindrical spring abuts against an inner side of a top portion of the keycap 31, and the other end of the cylindrical spring abuts against a bottom portion of the annular groove 214.

Based on a same concept, an embodiment of this application further provides an electronic device, including a housing 10 and the foregoing key structure 100. In addition to the foregoing key structure 100, the electronic device further includes a main board and another related structure. The main board and the another related structure are all disposed in the housing 10.

As described above, the key structure 100 in each embodiment is applied to an electronic device such as a mobile phone, a tablet computer, a television, a neck-worn Bluetooth headphone, a headphone, and a true wireless stereo (True Wireless Stereo, TWS) headphone, so that the key component 30 of the electronic device has a comfortable hand feeling, and user experience is good.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A key structure comprising:

a mounting seat configured to axially penetrate through a mounting hole located on a housing of an electronic device;

a key component mounted on the mounting seat and comprising a first end configured to penetrate into the housing from the mounting seat;

a clamping holder coupled to the mounting seat; and a switch device mounted on the clamping holder, disposed opposite to the first end, and configured to couple to a main board of the electronic device, wherein the key component is configured to abut against the switch device to trigger the switch device when the key component is subjected to pressure toward the switch device.

2. The key structure of claim 1, wherein the mounting seat comprises a first outer peripheral wall configured to adapt to a side wall of the mounting hole, and wherein the clamping holder is configured to axially limit the mounting seat.

3. The key structure of claim 2, further comprising a first sealing element configured to abut between the first outer peripheral wall and the side wall.

4. The key structure of claim 2, further comprising:

a first slot disposed on the first outer peripheral wall; and a first insertion block disposed on the clamping holder and inserted into the first slot to axially limit the mounting seat.

5. The key structure of claim 4, further comprising:

a plurality of oppositely disposed first slots disposed on the first outer peripheral wall; and a plurality of oppositely disposed first insertion blocks disposed on the clamping holder, wherein the oppositely disposed first slots are in a one-to-one correspondence with the oppositely disposed first insertion blocks, and wherein the oppositely disposed first insertion blocks are inserted into the oppositely disposed first slots in a straight line along one direction.

6. The key structure of claim 4, wherein the clamping holder comprises an abutting plate disposed on the clamping holder, and wherein the abutting plate is configured to abut against an inner side of the housing when the first insertion block is inserted into the first slot.

7. The key structure of claim 6, wherein the clamping holder further comprises:

a U-shaped structure comprising two sides, wherein the switch device is located in the U-shaped structure;

a plurality of first insertion blocks disposed on the two sides; and a plurality of abutting plates disposed on the two sides.

8. The key structure of claim 7, wherein the mounting seat comprises a second end configured to expose on the housing, and wherein the key component further comprises:

a keycap sleeved on the second end for pressing; and a drive rod coupled to the keycap and configured to axially penetrate through the mounting seat.

9. The key structure of claim 8, wherein the mounting seat comprises:

a sleeve body configured to axially penetrate through the mounting hole, wherein the drive rod is disposed to penetrate through the sleeve body; and a stopper portion coupled to the sleeve body, configured to perform stopping, and configured to accommodate in an accommodation groove that is coupled to the mounting hole and that is located on an outer side of the housing, wherein the keycap is sleeved on the stopper portion and is partially accommodated in the accommodation groove.

10. The key structure of claim 9, further comprising a second sealing element configured to abut between the drive rod and the sleeve body.

11. The key structure of claim 9, wherein the stopper portion comprises a second outer peripheral wall, and wherein the keycap is of a non-rotator structure and comprises:

a third outer peripheral wall configured to adapt to a first inner peripheral wall of the accommodation groove; and a second inner peripheral wall configured to adapt to the second outer peripheral wall.

12. The key structure of claim 11, further comprising:

at least one elastic component configured to abut between the keycap and a bottom portion of the accommodation groove; and an avoiding hole is disposed at a location that is on the stopper portion and that corresponds to the at least one elastic component.

13. The key structure of claim 11, wherein the stopper portion comprises a step disposed on the stopper portion, wherein the keycap further comprises a clamping hook disposed on the keycap and configured to hook to the step after rotation to define a reset stroke of the keycap.

14. The key structure of claim 9, wherein each of the keycap and the stopper portion is of a rotator structure, wherein the clamping holder further comprises a second insertion block disposed on the clamping holder, wherein the drive rod comprises a second slot disposed on the drive rod, and wherein the second insertion block is inserted into the second slot and is configured to axially slide in the second slot.

15. The key structure of claim 14, further comprising:

a connecting plate that extends on the U-shaped structure;

a plurality of second insertion blocks disposed at intervals extending from the connecting plate to a middle of the U-shaped structure; and a plurality of second slots disposed on two opposite sides of the drive rod, wherein the second insertion blocks are in a one-to-one correspondence with the second slots, and wherein the second insertion blocks are configured to insert into the second slots.

16. An electronic device comprising:

a housing comprising a mounting hole;

a main board; and a key structure comprising:

a mounting seat axially penetrating through the mounting hole;

a key component mounted on the mounting seat and comprising a first end that penetrates into the housing from the mounting seat;

a clamping holder coupled to the mounting seat; and a switch device mounted on the clamping holder, disposed opposite to the first end, and coupled to the main board, wherein the key component is configured to abut against the switch device to trigger the switch device when the key component is subjected to pressure toward the switch device.

17. The electronic device of claim 16, wherein the mounting hole comprises a side wall, wherein the mounting seat comprises a first outer peripheral wall configured to adapt to the side wall, and wherein the clamping holder is configured to axially limit the mounting seat.

18. The electronic device of claim 17, wherein the key structure further comprises a first sealing element configured to abut between the first outer peripheral wall and the side wall.

19. The electronic device of claim 17, wherein the key structure comprises:

a first slot disposed on the first outer peripheral wall; and a first insertion block disposed on the clamping holder and inserted into the first slot to axially limit the mounting seat.

20. The electronic device of claim 19, wherein the key structure comprises:

a plurality of oppositely disposed first slots disposed on the first outer peripheral wall; and a plurality of oppositely disposed first insertion blocks disposed on the clamping holder, wherein the oppositely disposed first slots are in a one-to-one correspondence with the oppositely disposed first insertion blocks, and wherein the oppositely disposed first insertion blocks are inserted into the oppositely disposed first slots in a straight line along one direction.

* * * * *